United States Patent [19]

Fredrickson et al.

[11] 4,372,727
[45] Feb. 8, 1983

[54] TRAILER INCLUDING A MULTIPLE FOLD POWERED RAMP TAIL

[75] Inventors: Ronald G. Fredrickson; Joseph W. Bills, Jr., both of Mitchell, S. Dak.

[73] Assignee: Dakota Manufacturing Co., Inc., Mitchell, S. Dak.

[21] Appl. No.: 248,972

[22] Filed: Mar. 30, 1981

[51] Int. Cl.³ .............................................. B60P 1/00
[52] U.S. Cl. ...................................... 414/537; 296/61
[58] Field of Search .................. 14/71.1, 71.3, 71.5, 14/71.7; 414/537; 296/61

[56] References Cited

U.S. PATENT DOCUMENTS

| | | | |
|---|---|---|---|
| 2,776,063 | 1/1957 | Larson | 414/537 X |
| 3,642,156 | 2/1972 | Stenson | 414/537 |
| 3,799,479 | 3/1974 | Roeder | 244/137 R |
| 4,068,770 | 1/1978 | Boehringer | 14/71.1 X |

*Primary Examiner*—Richard A. Schacher
*Attorney, Agent, or Firm*—Zarley, McKee, Thomte, Voorhees & Sease

[57] ABSTRACT

A multiple fold ramp tail for a trailer is described comprising a wheeled frame having rearward and forward ends with the forward end of the frame being suitable for connection to a prime mover such as a truck or the like. A multiple fold ramp tail is pivotally connected to the rearward end of the frame and comprises a main ramp portion, first stage ramp portion and a second stage ramp portion. The forward end of the main ramp portion is pivotally connected to the rearward end of the frame and the forward end of the first stage ramp portion is pivotally connected to the rearward end of the main ramp portion. The second stage ramp portion is pivotally connected at its forward end to the rearward end of the first stage ramp portion. The first and second stage ramp portions are normally in a stored position wherein they are folded upon themselves beneath the lower rearward end of the main ramp portion. The first and second stage ramp portions may be unfolded to an operative position so that they form an extension of the main ramp portion with the main ramp portion being adapted to be moved to an inclined position so that the rearward end of the second stage ramp portion may be placed in engagement with the ground surface.

9 Claims, 8 Drawing Figures

TRAILER INCLUDING A MULTIPLE FOLD POWERED RAMP TAIL

BACKGROUND OF THE INVENTION

The trailer transportation of heavy farm and industrial equipment requires special loading ramps at the rear end of the trailer. FIG. 1 of the patent drawings illustrates a typical prior art trailer wherein a hinged ramp is raised and lowered by a hydraulic cylinder or the like. The ramp of the prior art as illustrated in FIG. 1 has been generally satisfactory but it does have some serious disadvantages and/or limitations. In the prior art trailer, a significant amount of the trailer deck is unusable for carrying cargo. The ramp tail of the prior art trailer also causes a load imbalance at the rear of the trailer suspension centerline. Additionally, the prior art trailer requires that the axle must be located forwardly of the ramp hinge which causes a reduction of the payload due to increased suspension loading. Further, lower legal axle loading is necessary in the prior art trailers due to bridge laws which normally specify the ground load limits for groups of axles located at given spaced distances. As the distance between succeeding axles increases, ground allowable loads also increase.

It is therefore a principal object of the invention to provide a trailer including a multiple fold ramp tail wherein an increased amount of trailer deck is usable for carrying cargo.

A further object of the invention is to provide a trailer of the type described wherein a load imbalance at the rear of the trailer suspension centerline is avoided.

A still further object of the invention is to provide a trailer of the type described wherein the hinge between the main frame and the ramp is positioned directly above the rearward most axle centerline.

A further object of the invention is to provide a trailer of the type described including a simplified lock mechanism which maintains the ramp in the operative cargo carrying position.

A still further object of the invention is to provide a trailer of the type described which is durable and convenient.

These and other objects will be apparent to those skilled in the art.

SUMMARY OF THE INVENTION

A trailer including a multiple fold powered ramp tail is described including a main ramp portion which is pivotally connected at its upper forward end to the upper rearward end of the main frame of the trailer. A first stage ramp portion is pivotally connected at its lower forward end to the lower rearward end of the main ramp portion and may be pivotally moved from a position wherein it is parallel to the main ramp portion to a storage position beneath the lower rearward end thereof. A second stage ramp portion is pivotally secured at its lower forward end to the lower rearward end of the first stage ramp portion and is pivotally movable from a position wherein it is parallel to the main and first stage ramp portions to a stored position beneath the lower rearward end of the first stage ramp portion. Means is provided for pivotally moving the ramp portions with respect to each other and with respect to the main frame. Means is also provided for maintaining the ramp tail in the cargo carrying position.

DESCRIPTION OF THE PREFERRED EMBODIMENT

Figure 2:
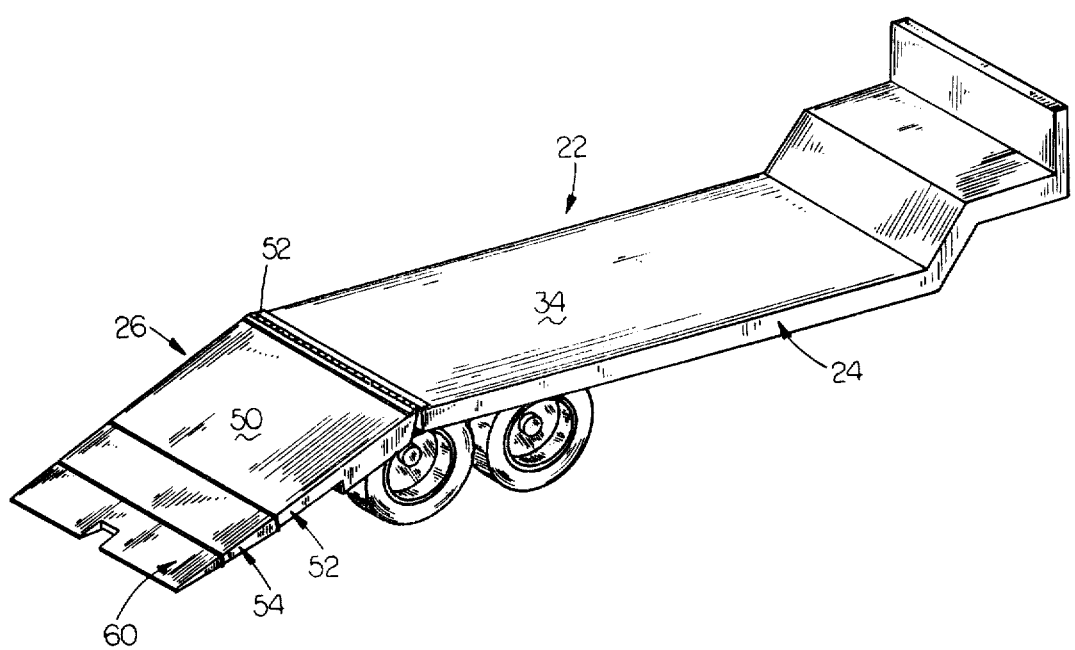
FIG. 2 is a rear perspective view of the trailer of this invention with the ramp in a lowered position.
Figure 1:
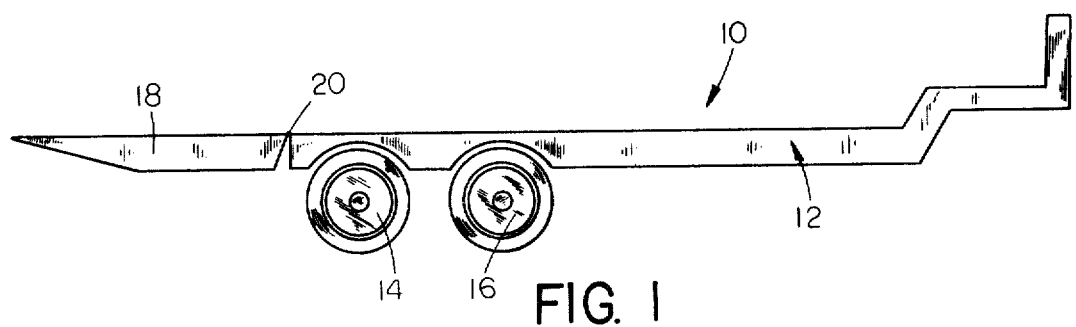
FIG. 1 is a side view illustrating a typical prior art trailer.

As previously stated, FIG. 1 illustrates a prior art trailer 10 including a main frame means 12 having a pair of wheel assemblies 14 and 16 at the rearward end thereof. A loading ramp 18 is pivotally connected to the rearward end of the frame means 12 at 20 which is located rearwardly of the axle assembly of the wheel assembly 14 as illustrated in FIG. 1. The ramp 18 may be pivotally moved by means of a hydraulic cylinder or the like from the position illustrated in FIG. 1 to a lower position wherein the rearward end of the ramp 18 would be in ground engagement to enable cargo to be loaded onto the main frame 12. Once the cargo has been loaded on the main frame 12, ramp 18 is moved to the position illustrated in FIG. 1.

The trailer 10 of FIG. 1 does suffer some limitations and disadvantages in that a significant amount of the trailer deck is unusable for carrying cargo. The fact that the hinge 20 of the trailer 10 is located rearwardly of the rearward most axle also causes a load imbalance at the rear of the trailer suspension centerline. Additionally, the trailer 10 suffers from a reduction of possible payload due to increased suspension loading since the axle of wheel assembly 14 is located forwardly of the ramp hinge 20.

The numeral 22 refers to the trailer of this invention and generally includes a main frame portion 24 and a powered multiple fold ramp tail assembly 26 as will be described in more detail hereinafter. Main frame 24 includes a pair of longitudinally extending frame members 28 and 30 (not shown) upon which the deck 34 is positioned. The frame members 28 and 30 are of conventional design except for the fact that the rearward ends are tapered as seen in FIGS. 4-8. A pair of axle and wheel assemblies 36 and 38 forming the trailer suspension system are secured to the frame members 28 and 30 in conventional fashion. Each of the frame members 28 and 30 are provided with a locking block 42 welded to the lower rearward end thereof which extends rearwardly therefrom.

The numeral 52 refers to a main ramp portion which is hingedly secured at the upper forward end thereof to the upper rearward ends of the frame members 28 and 30 as illustrated. Main ramp portion 52 includes a deck material 50 on a suitable framework to provide the necessary strength for the assembly. In the preferred embodiment, a hydraulic cylinder 66 or the like is pivotally connected at one end thereof to the lower rearward end of frame member 28 and to the main ramp portion 52 to enable the main ramp portion 52 to be pivotally moved relative to the main frame of the trailer. A second hydraulic cylinder 66' (not shown) identical to cylinder 66 is secured to and extends between the lower rearward end of frame member 30 and the main ramp portion 52.

The numeral 54 refers to a first stage ramp portion which is pivotally connected at its lower forward end to the lower rearward end of main ramp portion 52 as illustrated in the drawings. A suitable linkage 56 is pivotally secured to ramp portions 52 and 54 and extends therebetween as seen in the drawings. At least one hydraulic cylinder 58 is pivotally connected to ramp portion 52 and to the linkage 56 to cause ramp portion 54 to pivotally move relative to ramp portion 52.

The numeral 60 refers to a second stage ramp portion which is pivotally connected at its lower forward end to the lower rearward end of the first stage ramp portion 54 as seen in the drawings. A suitable linkage 62 is pivotally connected to the ramp portions 54 and 60 as soon in the drawings and has at least one hydraulic cylinder 64 connected thereto for pivotally moving the second stage ramp portion 60 relative to the first stage ramp portion 54.

Figure 3:
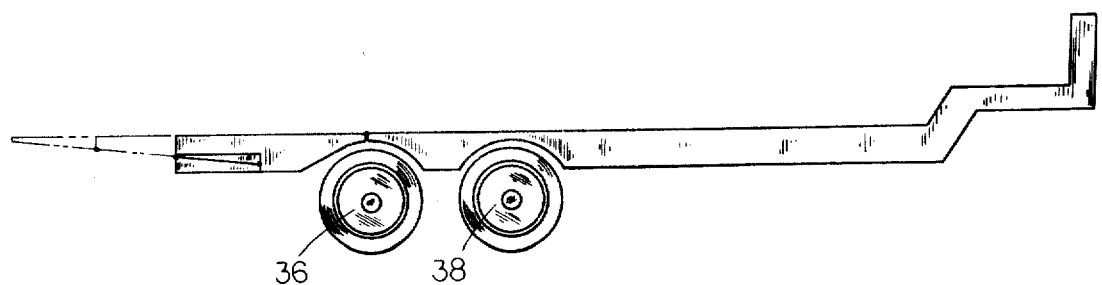
FIG. 3 is a side view of the trailer of this invention in the cargo carrying position with the broken lines illustrating the position to which the ramp tail may be pivoted.
Figure 4:
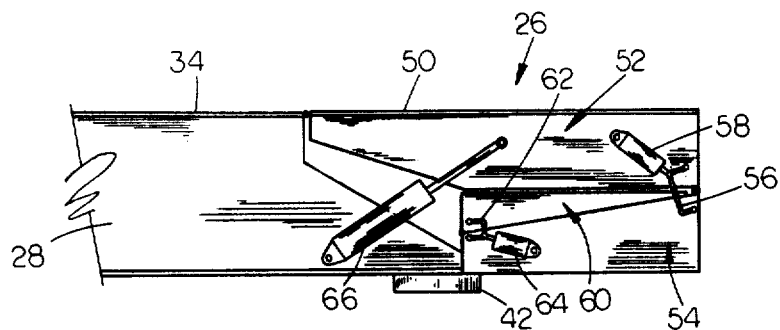
FIGS. 4-8 are partial side views illustrating the sequence of the movement of the ramp tail from the cargo carrying position to the loading position.
Figure 5:
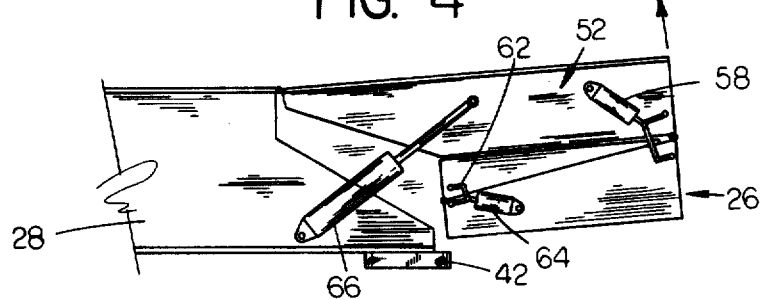
Figure 6:
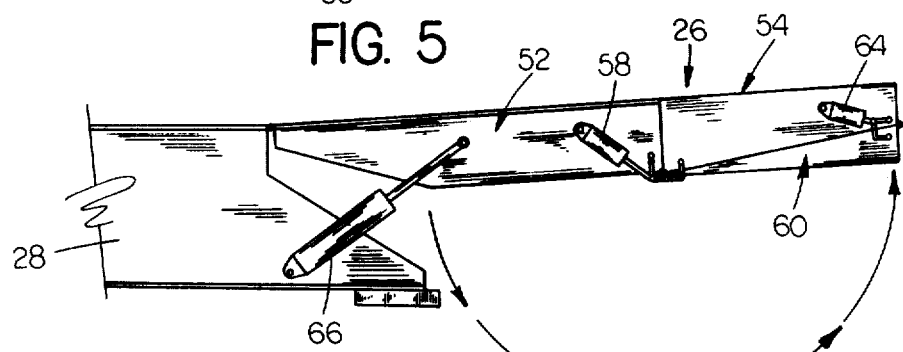
Figure 7:
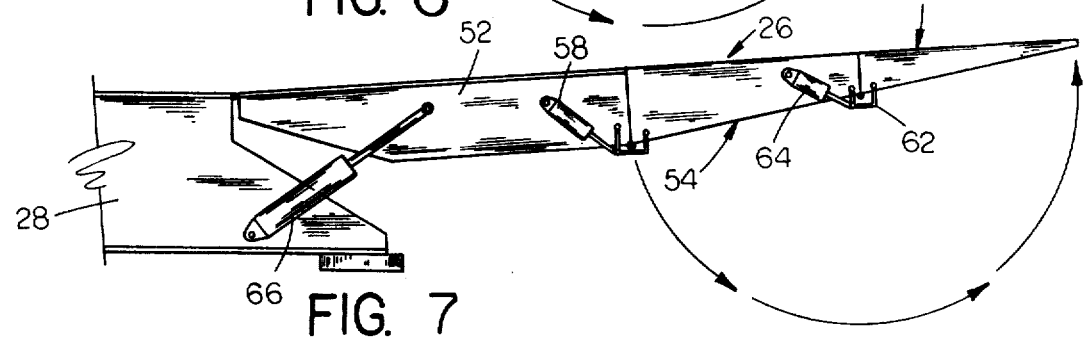

As illustrated, the second stage ramp portion 60 may be moved from a position wherein the upper portion thereof is aligned with the upper portions of ramp portions 52 and 54 to a position wherein it is positioned beneath the lower rearward end of the ramp portion 54 as seen in FIG. 6. When the ramp 26 is in the cargo carrying position illustrated by solid lines in FIGS. 3 and 4, ramp portion 60 is positioned below the lower rearward end of ramp portion 52 and ramp portion 54 is positioned below ramp portion 60. As illustrated in FIG. 4, when the ramp 26 is in the cargo carrying position, the deck surface 50 will be parallel to the deck 34. When the ramp assembly 26 is in the cargo carrying position of FIGS. 3 and 4, the ramp portion 54 rests upon the upper rearward end of the blocks 42 to maintain the ramp 26 in the cargo carrying position and to reduce the strain which would otherwise be imparted to the hydraulic cylinders 66 and 66'. Thus, weight applied to the ramp assembly 26, when in the cargo carrying position, will be transferred to the blocks 42 and to the frame members 28 and 30. When it is desired to move the ramp assembly 26 from the cargo carrying position of FIG. 4 to the operative or loading position of FIG. 8, hydraulic cylinders 66 and 66' are first extended to raise the entire ramp assembly 26 to the position illustrated in FIG. 5 so that ramp portion 54 will be disengaged from the blocks 42. When the ramp assembly 26 has been raised to the position of FIG. 5, the hydraulic cylinder or cylinders 58 are then extended to cause ramp portion 54 to be pivoted from the folded position to the operative position illustrated in FIG. 6. The hydraulic cylinder or cylinders 64 are then extended to cause the ramp portion 60 to be pivoted from the folded or stored position to the operative position as illustrated in FIG. 7. When the ramp portion 52, 54 and 60 have been pivoted to the position of FIG. 7, hydraulic cylinders 66 and 66' are then retracted to lower the ramp assembly 26 into ground engagement as illustrated in FIG. 8.

Figure 8:
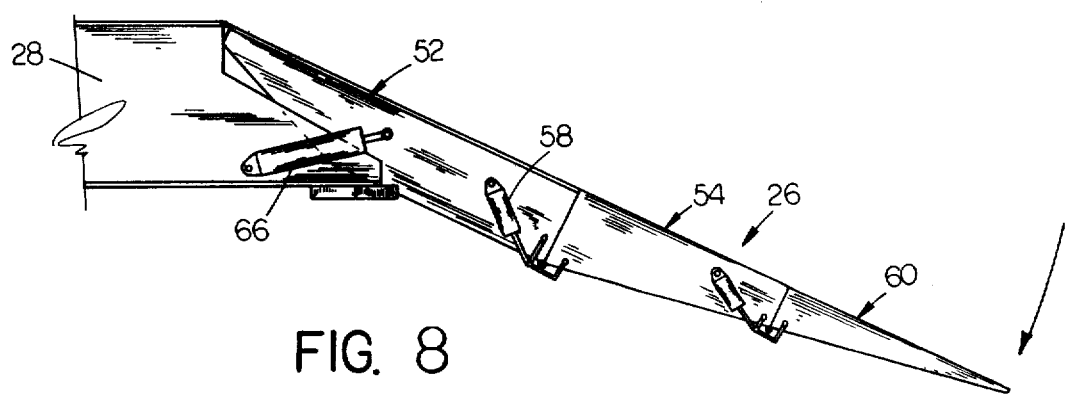

When it is desired to move the assembly from the position of FIG. 8 to the position of FIG. 4, the procedure just described is reversed. Hydraulic cylinders 66 and 66' are first extended to raise the ramp assembly 26 to the approximate position of FIG. 7. The hydraulic cylinder or cylinders 64 are then retracted to pivotally move the ramp portion 60 to the folded position beneath ramp portion 54. Hydraulic cylinder or cylinders 58 are then retracted to cause the ramp portion 54 to be folded beneath the ramp portion 52. The hydraulic cylinders 66 and 66' are then retracted until the ramp portion 54 engages and rests upon the blocks 42.

It is important to note that the multiple fold powered ramp tail described herein permits the hinge connection between the ramp assembly 26 and the main frame portion 24 to be moved directly over the axle centerline of the axle assembly 36 to achieve the objectives set forth hereinbefore. Thus it can be seen that a novel trailer has been described which achieves at least all of the stated objectives.

We claim:
1. A trailer comprising,
a wheeled frame means having rearward and forward ends and a
support deck for supporting a load thereon,
means on the forward end of said frame means for connecting said frame means to a prime mover,
a multiple fold ramp assembly pivotally connected to the rearward end of said frame means,
said ramp assembly comprising a main ramp portion having an upper support deck portion and rearward and forward ends and being pivotally connected at its forward end, about a horizontal axis, to the rearward end of said frame means; a first stage ramp portion having an upper support deck portion and rearward and forward ends and being pivotally connected at its forward ends, about a horizontal axis, to the rearward end of said main ramp portion; and a second stage ramp portion having an upper support deck and rearward and forward ends and being pivotally connected, at its forward end, about a horizontal axis, to the rearward end of said first stage ramp portion,
said main ramp portion being selectively pivotally movable between first and second positions, the upper support deck of said main ramp portion being substantially horizontal when said main ramp portion is in its first position and being inclined downwardly and rearwardly with respect to said frame means when said main ramp portion is in its second position,
said upper support deck of said main ramp portion being substantially parallel to said support deck on said frame means when in its said first position,
said first stage ramp portion being selectively movable from a stored position beneath the lower rearward end of said main ramp portion to an operative position wherein its upper support deck portion is substantially parallel with the upper support deck portion of said main ramp portion,
said second stage ramp portion being selectively movable from a stored position beneath the lower rearward end of said main ramp portion to an operative position wherein its upper support deck portion is substantially parallel with the upper support deck portion of said first stage ramp portion.

2. The trailer of claim 1 wherein said second stage ramp portion is positioned above said first stage ramp portion when said first stage and second stage ramp portions are in their stored positions.

3. The trailer of claim 1 wherein means is provided to maintain said main ramp portion in its said first position and said first and second stage ramp portions in their stored positions.

4. The trailer of claim 1 wherein said frame means has a rear axle assembly provided thereon and wherein the hinge connection between said frame means and said main ramp portion is positioned directly above the centerline of said rear axle assembly.

5. The trailer of claim 1 wherein said frame means has a rear axle assembly provided thereon including front and rear axles and wherein the pivotal connection between said frame means and said main ramp portion is positioned directly above the centerline of said rear axle.

6. The trailer of claim 1 wherein said support deck on said main ramp portion, and said support deck portions of said first stage ramp portion and said second stage ramp portion are parallel when said main ramp portion is in its said second position and said first and second stage ramp portions are in their operative positions.

7. The trailer of claim 3 wherein said means for maintaining said ramp portion in its said first position comprises a locking block means secured to said frame means which limits the downward pivotal movement of said ramp assembly relative to said frame means.

8. The trailer of claim 7 wherein said locking block means is secured to the lower rearward end of said frame means and extends rearwardly therefrom, the rearward end of said support deck portion of said first stage ramp portion being in supported engagement with said locking block means when said main ramp portion is in its said first position and said first and second stage ramp portions are in their stored positions.

9. An apparatus for carrying cargo comprising,
a wheeled frame means having rearward and forward ends and a support deck for supporting a load thereon,
a multiple fold ramp assembly pivotally connected to the rearward end of said frame means,
said ramp assembly comprising a main ramp portion having an upper support deck portion and rearward and forward ends and being pivotally connected at its forward end, about a horizontal axis, to the rearward end of said frame means; a first stage ramp portion having an upper support deck portion and rearward and forward ends and being pivotally connected at its forward ends, about a horizontal axis, to the rearward end of said main ramp portion; and a second stage ramp portion having an upper support deck portion and rearward and forward ends and being pivotally connected, at its forward end, about a horizontal axis, to the rearward end of said first stage ramp portion,
said main ramp portion being selectively pivotally movable between first and second positions, the upper support deck of said main ramp portion being substantially horizontal when said main ramp portion is in its first position and being inclined downwardly and rearwardly with respect to said frame means when said main ramp portion is in its second position,
said upper support deck of said main ramp portion being substantially parallel to said support deck on said frame means when in its said first position,
said first stage ramp portion being selectively movable from a stored position beneath the lower rearward end of said main ramp portion to an operative position wherein its upper support deck portion is substantially parallel with the upper support deck portion of said main ramp portion,
said second stage ramp portion being selectively movable from a stored position beneath the lower rearward end of said main ramp portion to an operative position wherein its upper support deck portion is substantially parallel with the upper support deck portion of said first stage ramp portion.

* * * * *